US012650040B2

(12) United States Patent
Annamalai et al.

(10) Patent No.: US 12,650,040 B2
(45) Date of Patent: Jun. 9, 2026

(54) DOOR LATCH APPARATUS AND ASSOCIATED SYSTEM AND METHOD

(71) Applicant: The Boeing Company, Arlington, VA (US)

(72) Inventors: Venkatesh Annamalai, Bangalore (IN); Natla Veera Venkata Satya Narayana Raja, Bangalore (IN)

(73) Assignee: The Boeing Company, Arlington, VA (US)

( * ) Notice: Subject to any disclaimer, the term of this patent is extended or adjusted under 35 U.S.C. 154(b) by 47 days.

(21) Appl. No.: 18/669,289

(22) Filed: May 20, 2024

(65) Prior Publication Data

US 2025/0354419 A1     Nov. 20, 2025

(51) Int. Cl.
*E05C 9/06* (2006.01)
*B64C 1/14* (2006.01)
*E05C 9/20* (2006.01)

(52) U.S. Cl.
CPC ............ *E05C 9/063* (2013.01); *B64C 1/1415* (2013.01); *E05C 9/20* (2013.01)

(58) Field of Classification Search
CPC ... E05C 9/063; E05C 9/20; E05C 9/08; E05C 9/085; E05C 9/10; E05C 9/14; E05C 9/16; E05C 9/22; E05C 1/12; E05C 1/16; B64C 1/1415; Y10T 292/0961; Y10T 292/0909; Y10T 292/1999; Y10T 292/28; Y10T 292/282; Y10T 292/37; Y10T 292/379; Y10T 292/57; E05B 1/003; E05B 15/04; E05B 15/0403; E05B 15/0413; E05B 79/10; E05B 79/12; E05B 79/18
See application file for complete search history.

(56) References Cited

U.S. PATENT DOCUMENTS

| | | | | |
|---|---|---|---|---|
| 959,406 | A | * | 5/1910 | Unckrich ................ E05C 9/043 |
| | | | | 27/35 |
| 1,269,572 | A | * | 6/1918 | Allenbaugh ............ E05C 9/045 |
| | | | | 292/37 |
| 1,345,967 | A | * | 7/1920 | Smelser .................... E06B 7/18 |
| | | | | 49/318 |

(Continued)

FOREIGN PATENT DOCUMENTS

| | | | | |
|---|---|---|---|---|
| CH | 599438 | A5 * | 5/1978 | ............... E05C 9/06 |
| CN | 205224890 | U * | 5/2016 | ............... E05C 9/06 |

(Continued)

*Primary Examiner* — Steven A Tullia
(74) *Attorney, Agent, or Firm* — Kunzler Bean & Adamson

(57) ABSTRACT

A door latch apparatus and associated system and method are disclosed. The door latch apparatus includes a profile disc with a plurality of slots and a central aperture. A handle system, includes a first handle and a second handle, are co-rotatably coupled together, via a rod, that extends through the central aperture, allowing the handle system and the profile disc to be co-rotatable. A plurality of sliders are engaged with the plurality of slots so that, when the profile disc rotates, the plurality of sliders simultaneously slide along the plurality of slots. A plurality of locking rod are coupled to a corresponding one of the plurality of sliders, and are linearly movable between an extended rod position and a retracted rod position when the corresponding one of the plurality of sliders slides along the corresponding one of the plurality of slots.

20 Claims, 9 Drawing Sheets

(56) References Cited

U.S. PATENT DOCUMENTS

| | | | | | |
|---|---|---|---|---|---|
| 1,635,714 | A | * | 7/1927 | Hoffmann | E05C 9/045 292/37 |
| 1,909,697 | A | * | 5/1933 | Macbeth | E05B 13/004 292/164 |
| 2,381,512 | A | * | 8/1945 | Oxhandler | E05C 9/16 292/39 |
| 2,473,065 | A | * | 6/1949 | Miller | E05C 9/06 292/37 |
| 2,594,253 | A | * | 4/1952 | Vander Veer | B60J 9/02 292/181 |
| 2,729,089 | A | * | 1/1956 | Pelcin | E05B 47/0002 70/151 R |
| 3,007,348 | A | * | 11/1961 | Barnes | G05G 1/085 74/543 |
| 3,085,297 | A | * | 4/1963 | Linderfelt | B64C 1/1407 49/248 |
| 3,333,878 | A | * | 8/1967 | Pelcin | E05C 9/043 292/37 |
| 3,362,740 | A | * | 1/1968 | Burns | E05C 9/042 292/34 |
| 3,884,515 | A | * | 5/1975 | Ashkenazi | E05C 9/14 292/183 |
| 3,991,595 | A | * | 11/1976 | Bahry | E05C 9/14 70/120 |
| 4,037,440 | A | * | 7/1977 | Shabtai | E05C 9/14 70/120 |
| 4,114,933 | A | * | 9/1978 | Jankelewitz | E05C 9/14 70/108 |
| 4,294,134 | A | * | 10/1981 | Mori | G05G 1/085 296/223 |
| 4,306,432 | A | * | 12/1981 | Ravid | E05C 9/14 70/120 |
| 4,473,201 | A | * | 9/1984 | Barnes | B64C 1/1415 292/216 |
| 4,497,462 | A | * | 2/1985 | Hamatani | B64C 1/1415 244/129.5 |
| 4,510,714 | A | * | 4/1985 | Kasper | B64C 1/1415 49/249 |
| 4,758,030 | A | * | 7/1988 | Kupfernagel | B64C 1/1415 292/29 |
| 5,015,019 | A | * | 5/1991 | Razdolsky | E05B 13/002 292/DIG. 31 |
| 5,337,977 | A | * | 8/1994 | Fleming | B64C 1/143 D12/345 |
| 5,410,778 | A | * | 5/1995 | Langevin | E05F 11/10 74/545 |
| 5,802,673 | A | * | 9/1998 | Nemeth | E05F 11/40 74/548 |
| 5,938,248 | A | * | 8/1999 | Vickers | E05B 5/00 292/34 |
| 6,622,883 | B1 | * | 9/2003 | Wu | H01L 21/67373 220/323 |
| 7,147,256 | B2 | * | 12/2006 | Gill | E05F 11/16 292/DIG. 31 |
| 8,091,282 | B2 | * | 1/2012 | Speyer | E05C 9/063 49/316 |
| 9,068,381 | B2 | * | 6/2015 | Segev | E05C 9/10 |
| 9,152,189 | B2 | * | 10/2015 | Fan | G06F 1/187 |
| 9,226,622 | B2 | * | 1/2016 | Le | E05B 15/101 |
| 9,428,940 | B1 | * | 8/2016 | Patrick | E05C 1/16 |
| 10,669,754 | B2 | * | 6/2020 | Lizotte | E05B 13/10 |
| 11,454,045 | B2 | * | 9/2022 | Miller | E05B 5/003 |
| 2003/0111848 | A1 | * | 6/2003 | Hansen | E05B 1/0092 292/336.3 |
| 2005/0212305 | A1 | * | 9/2005 | Gill | E05F 11/16 292/336.3 |
| 2013/0081435 | A1 | * | 4/2013 | Carey | E05B 63/0065 70/344 |

FOREIGN PATENT DOCUMENTS

| | | | | | | |
|---|---|---|---|---|---|---|
| CN | 107975304 | A | * | 5/2018 | | E05B 65/006 |
| CN | 111520036 | A | * | 8/2020 | | E06B 3/7017 |
| CN | 111734239 | A | * | 10/2020 | | E05C 9/063 |
| DE | 3539480 | A1 | * | 5/1987 | | B64C 1/1415 |
| EP | 105082 | A | * | 4/1984 | | B64C 1/1415 |
| EP | 4098554 | A1 | * | 12/2022 | | B64C 1/1461 |
| JP | 6367141 | B2 | * | 8/2018 | | E05C 1/06 |
| NO | 141765 | B | * | 1/1980 | | E05C 9/06 |
| WO | WO-2022264042 | A1 | * | 12/2022 | | E05C 9/063 |

* cited by examiner

Figure 8:
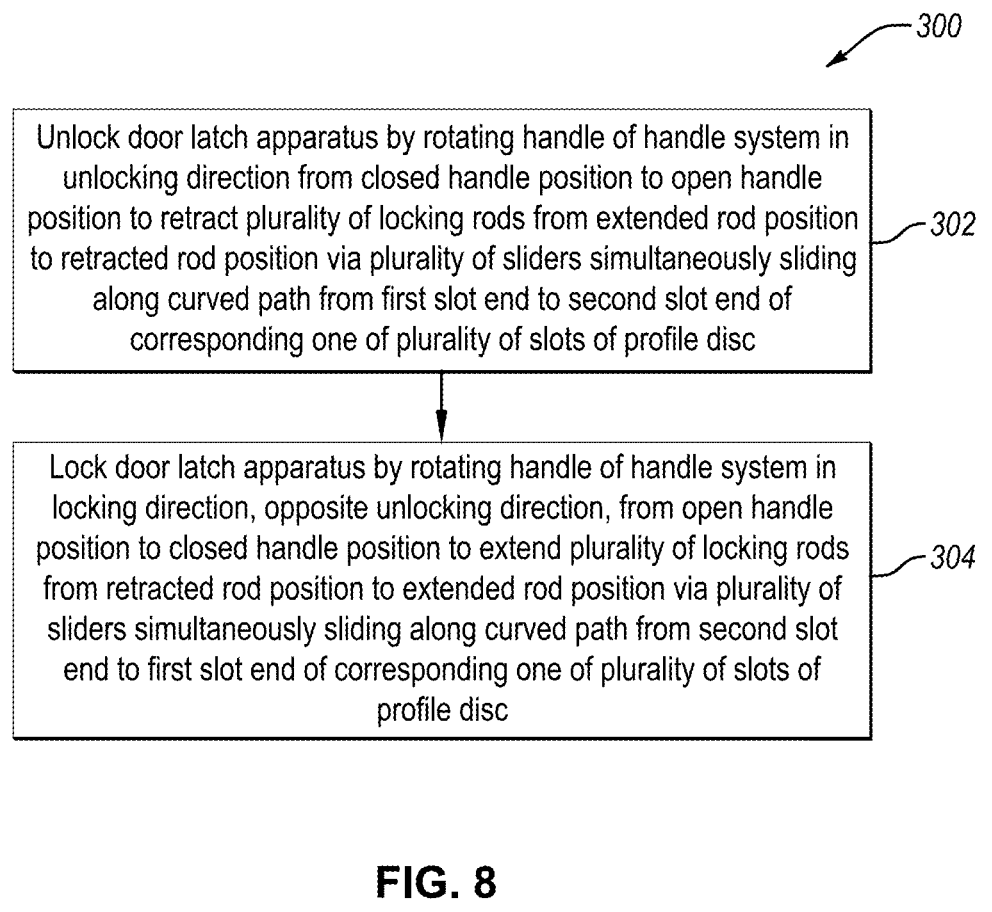

_300

Unlock door latch apparatus by rotating handle of handle system in unlocking direction from closed handle position to open handle position to retract plurality of locking rods from extended rod position to retracted rod position via plurality of sliders simultaneously sliding along curved path from first slot end to second slot end of corresponding one of plurality of slots of profile disc

_302

Lock door latch apparatus by rotating handle of handle system in locking direction, opposite unlocking direction, from open handle position to closed handle position to extend plurality of locking rods from retracted rod position to extended rod position via plurality of sliders simultaneously sliding along curved path from second slot end to first slot end of corresponding one of plurality of slots of profile disc

DOOR LATCH APPARATUS AND ASSOCIATED SYSTEM AND METHOD

FIELD

This disclosure relates generally to a door latch apparatus and more particularly to a door latch apparatus using a profile disc.

BACKGROUND

In vehicles designed for transporting goods, such as aircraft, a rigid cargo barrier (RCB) door serves to separate the cargo hold area from other compartments. The RCB door acts as a physical barrier by preventing cargo from entering other compartments during sudden stops, acceleration, or collisions. Conventional door latch systems for RCB doors often utilize a planetary gear system, with some requiring a handle revolution of 300 degrees. The extensive revolution of the door latch system renders it uncomfortable and difficult for user to operate. Moreover, the planetary gear system occupies a significant portion of the door frame, necessitating specific machining to accommodate the mechanism. This not only complicates the manufacturing process but also contributes to the costly production of the planetary gear system.

SUMMARY

The subject matter of the present application has been developed in response to the present state of the art, and in particular, in response to the problems of and needs created by, or not yet fully solved by, existing door latch apparatuses. Generally, the subject matter of the present application has been developed to provide a door latch apparatus and associated system and method that overcomes at least some of the above-discussed shortcomings of prior art techniques.

Disclosed herein is a door latch apparatus. The door latch apparatus includes a profile disc having a disc thickness and having a plurality of slots and a central aperture. The plurality of slots and the central aperture each extends through the disc thickness. Each one of the plurality of slots curves from a first slot end, adjacent to an outer disc edge of the profile disc, to a second slot end, adjacent to the central aperture. The door latch apparatus also includes a handle system having a first handle, a second handle, and a rod co-rotatably coupling the first handle to the second handle. The rod extends through the central aperture of the profile disc and is co-rotatably fixed, relative to the profile disc, such that the first handle, the second handle, the rod, and the profile disc are co-rotatable. The first handle and the second handle are selectively rotatable between, and inclusive of, a closed handle position and an open handle position. The door latch apparatus further includes a plurality of sliders each engaged with a corresponding one of the plurality of slots so that, when the profile disc rotates, the plurality of sliders simultaneously slide along the plurality of slots. The door latch apparatus additionally includes a plurality of locking rods each coupled to a corresponding one of the plurality of sliders and each linearly movable between, and inclusive of, an extended rod position and a retracted rod position when the corresponding one of the plurality of sliders slides along the corresponding one of the plurality of slots. When the first handle and the second handle are in the closed handle position, the plurality of locking rods are in the extended rod position and the plurality of sliders are positioned in a first slot end of the plurality of slots. When the first handle and the second handle are in the open handle position, the plurality of locking rods are in the retracted rod position and the plurality of sliders are positioned at a second slot end of the plurality of slots. The preceding subject matter of this paragraph characterized examples 1 of the present disclosure.

Each one of the plurality of slots are identically shaped. A distance that each one of the plurality of locking rods moves between the extended rod position and the retracted rod position is the same. The preceding subject matter of this paragraph characterizes examples 2 of the present disclosure, wherein example 2 also includes the subject matter according to example 1, above.

The door latch apparatus includes a first outer plate having a first-plate central aperture and positioned between the first handle and the profile disc. The door latch apparatus also includes a second outer plate having a second-plate central aperture and positioned between the second handle and the profile disc. The rod of the handle system extends through the first-plate central aperture and the second-plate central aperture. The preceding subject matter of this paragraph characterizes examples 3 of the present disclosure, wherein example 3 also includes the subject matter according to any of examples 1-2, above.

At least one of the plurality of locking rods has a fixed length that is different than at least one other one of the plurality of locking rods. The preceding subject matter of this paragraph characterizes examples 4 of the present disclosure, wherein example 4 also includes the subject matter according to any of examples 1-3, above.

The plurality of locking rods consists of three locking rods. The preceding subject matter of this paragraph characterizes examples 5 of the present disclosure, wherein example 5 also includes the subject matter according to any of examples 1-4, above.

The plurality of locking rods includes a first locking rod, a second locking rod extending parallel to the first locking rod, and a third locking rod extending perpendicular to the first locking rod and the second locking rod. The preceding subject matter of this paragraph characterizes examples 6 of the present disclosure, wherein example 6 also includes the subject matter according to example 5, above.

The first handle and the second handle each include a handle base and an extendable handle portion that is selectively movable between, and inclusive of, a folder position, and an extended position. When in the folded position, the extendable handle position is folded into the handle base. When in the extended position, the extendable handle portion extends away from the handle base. The preceding subject matter of this paragraph characterizes examples 7 of the present disclosure, wherein example 7 also includes the subject matter according to any of examples 1-6, above.

The door latch apparatus includes a plurality of rod connectors each coupling a corresponding one of the plurality of sliders to a corresponding one of the plurality of locking rods. Each one of the plurality of rod connectors is rotatably coupled to the corresponding one of the plurality of sliders and non-rotatably fixed to the corresponding one of the plurality of locking rods. The preceding subject matter of this paragraph characterizes examples 8 of the present disclosure, wherein example 8 also includes the subject matter according to any of examples 1-7, above.

The first handle and the second handle are configured to selectively rotate ninety degrees or less between the closed handle position and the open handle position. The preceding subject matter of this paragraph characterizes examples 9 of the present disclosure, wherein example 9 also includes the subject matter according to any of examples 1-8, above.

Each one of the plurality of slots includes a uniform curve with a rate of curvature that is constant along a length of each one of the plurality of slots. The preceding subject matter of this paragraph characterizes examples 10 of the present disclosure, wherein example 10 also includes the subject matter according to any of examples 1-9, above.

Each one of the plurality of slots includes a non-uniform curve with a rate of curvature that varies along a length of each one of the plurality of slots. The preceding subject matter of this paragraph characterizes examples 11 of the present disclosure, wherein example 11 also includes the subject matter according to any of examples 1-10, above.

The plurality of slots includes an outer wall and an inner wall, opposite of the outer wall. The outer wall and the inner wall are configured to slidably engage with a corresponding one of the plurality of sliders as the plurality of sliders slide along the plurality of slots to facilitate the extension or retraction of a corresponding one of the plurality of locking rods. The preceding subject matter of this paragraph characterizes examples 12 of the present disclosure, wherein example 12 also includes the subject matter according to any of examples 1-11, above.

Further disclosed herein is a door latch system. The door latch system includes a door having a plurality of rod apertures and a door latch apparatus coupled to the door. The door latch apparatus includes a profile disc having a disc thickness and having a plurality of slots and a central aperture. The plurality of slots and the central aperture each extends through the disc thickness. Each one of the plurality of slots curves from a first slot end, adjacent to an outer disc edge of the profile disc, to a second slot end, adjacent to the central aperture. The door latch apparatus also includes a handle system having a first handle, a second handle, and a rod co-rotatably coupling the first handle to the second handle. The rod extends through the central aperture of the profile disc and is co-rotatably fixed, relative to the profile disc, such that the first handle, the second handle, the rod, and the profile disc are co-rotatable. The first handle and the second handle are selectively rotatable between, and inclusive of, a closed handle position and an open handle position. The door latch apparatus further includes a plurality of sliders each engaged with a corresponding one of the plurality of slots so that, when the profile disc rotates, the plurality of sliders simultaneously slide along the plurality of slots. The door latch apparatus additionally includes a plurality of locking rods each coupled to a corresponding one of the plurality of sliders and each linearly movable between, and inclusive of, an extended rod position and a retracted rod position when the corresponding one of the plurality of sliders slides along the corresponding one of the plurality of slots. Each one of the plurality of locking rods extends through a corresponding one of the plurality of rod apertures of the door. When the first handle and the second handle are in the closed handle position, the plurality of locking rods are in the extended rod position and the plurality of sliders are positioned in a first slot end of the plurality of slots. When the first handle and the second handle are in the open handle position, the plurality of locking rods are in the retracted rod position and the plurality of sliders are positioned at a second slot end of the plurality of slots. The preceding subject matter of this paragraph characterizes example 13 of the present disclosure.

The door includes a plurality of supporting ribs having a rib aperture. Each one of the plurality of locking rods extends through a corresponding rib aperture of at least one of the plurality of supporting ribs. The preceding subject matter of this paragraph characterizes examples 14 of the present disclosure, wherein example 14 also includes the subject matter according to example 13, above.

The plurality of supporting ribs includes at least one of a horizontal rib or a vertical rib. The preceding subject matter of this paragraph characterizes examples 15 of the present disclosure, wherein example 15 also includes the subject matter according to example 14, above.

Each one of the plurality of locking rods includes a spring-loaded mechanism having a spring. When the plurality of locking rods are in the extended rod position, the spring corresponding to each one of the plurality of locking rods is compressed. When the plurality of locking rods are in the retracted rod position, the spring corresponding to each one of the plurality of locking rods is expanded. The preceding subject matter of this paragraph characterizes examples 16 of the present disclosure, wherein example 16 also includes the subject matter according to any of examples 13-15, above.

The door is a sliding door. The preceding subject matter of this paragraph characterizes examples 17 of the present disclosure, wherein example 17 also includes the subject matter according to any of examples 13-16, above.

The door is a rigid cargo barrier door for an aircraft. The preceding subject matter of this paragraph characterizes examples 18 of the present disclosure, wherein example 18 also includes the subject matter according to any of examples 13-17, above.

Further disclosed herein is a method of operating a door latch apparatus. The method includes unlocking the door latch apparatus by rotating a handle of a handle system in an unlocking direction from a closed handle position to an open handle position to retract a plurality of locking rods from an extended rod position to a retracted rod position via a plurality of sliders simultaneously sliding along a curved path from a first slot end to a second slot end of a corresponding one of the plurality of slots of a profile disc. The method also includes locking the door latch apparatus by rotating the handle of the handle system in a locking direction, opposite the unlocking direction, from the open handle position to the closed handle position to extend the plurality of locking rods from the retracted rod position to the extended rod position via the plurality of sliders simultaneously sliding along the curved path from the second slot end to the first slot end of the corresponding one of the plurality of slots of the profile disc. The preceding subject matter of this paragraph characterizes example 19 of the present disclosure.

The method includes unfolding the handle of the handle system from a folded position to an extended position prior to unlocking the door latch apparatus by rotating the handle in the unlocking direction. The method also includes folding the handle of the handle system from the extended position to the folded position after locking the door latch apparatus by rotating the handle in the locking direction. The preceding subject matter of this paragraph characterizes examples 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 8 is a schematic flow diagram of a method of operating a door latch apparatus, according to one or more examples of the present disclosure.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a door latch apparatus and associated system and method. The following provides some features of at least one example of the door latch apparatus and associated system and method. The door latch apparatus features a profile disc having a plurality of slots extending through a thickness of the profile disc. A slider corresponds to each one of the plurality of slots and a corresponding locking rod. The sliders are configured to slides within the corresponding slot, enabling the corresponding locking rod to engage or disengage with a surrounding door frame or other component as needed. The door latch apparatus may be used on any of various doors facilitating both locking and unlocking functionalities of the door. One specific application of the door latch apparatus is in rigid cargo barrier (RCB) doors, which are utilized to separate cargo hold areas from other compartments, such as those found in aircraft cargo compartments. The door latch apparatus effectively secures the RCB door in place, offering a more compact solution compared to conventional door latches for RCB doors. Additionally, the efficiency of use of the door latch apparatus is improved by the reduced handle revolution required for operation compared to conventional door latches for RCB doors.

Figure 1A:
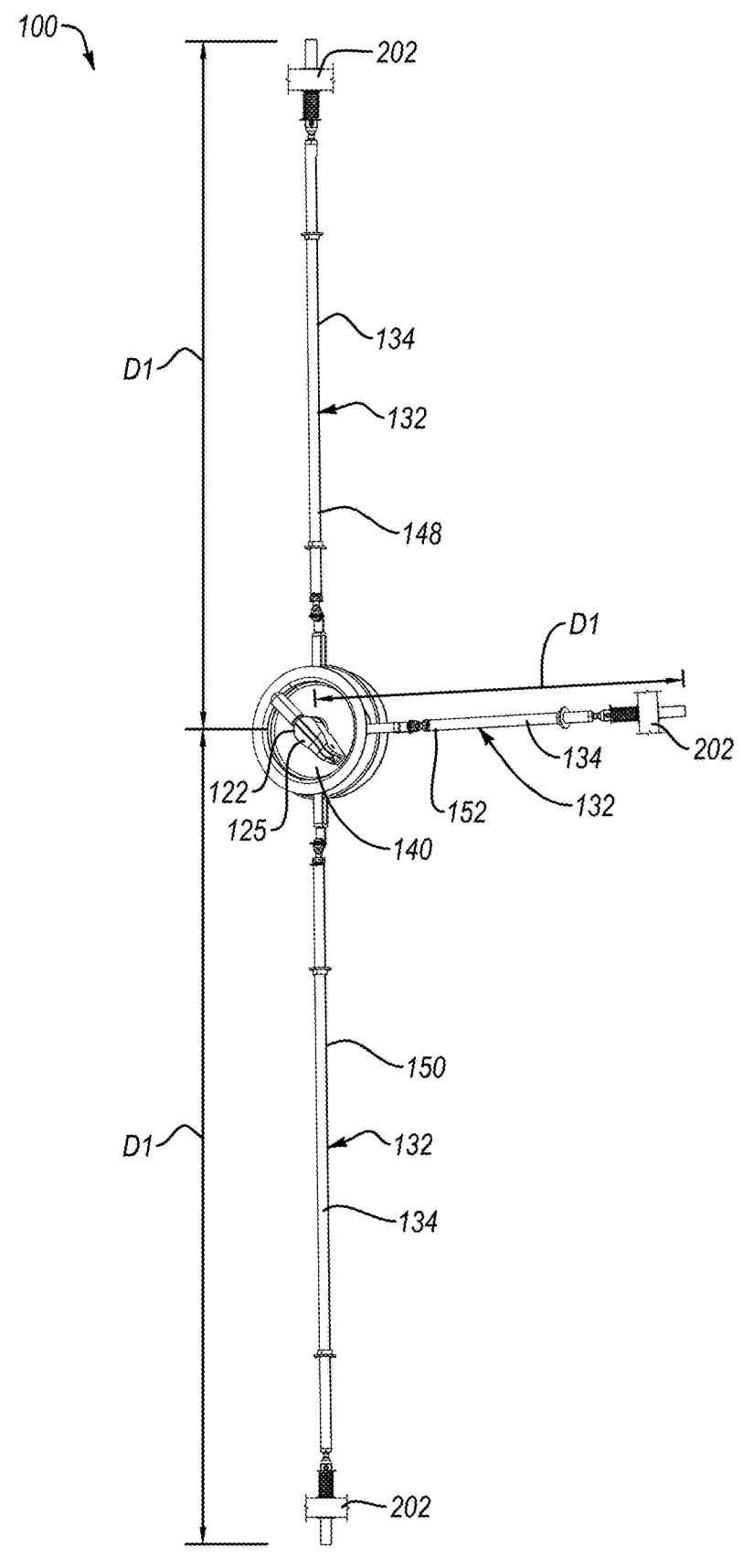
FIG. 1A is a schematic perspective view of a door latch apparatus, with a handle system in a closed handle position, according to one or more examples of the present disclosure.
Figure 1B:
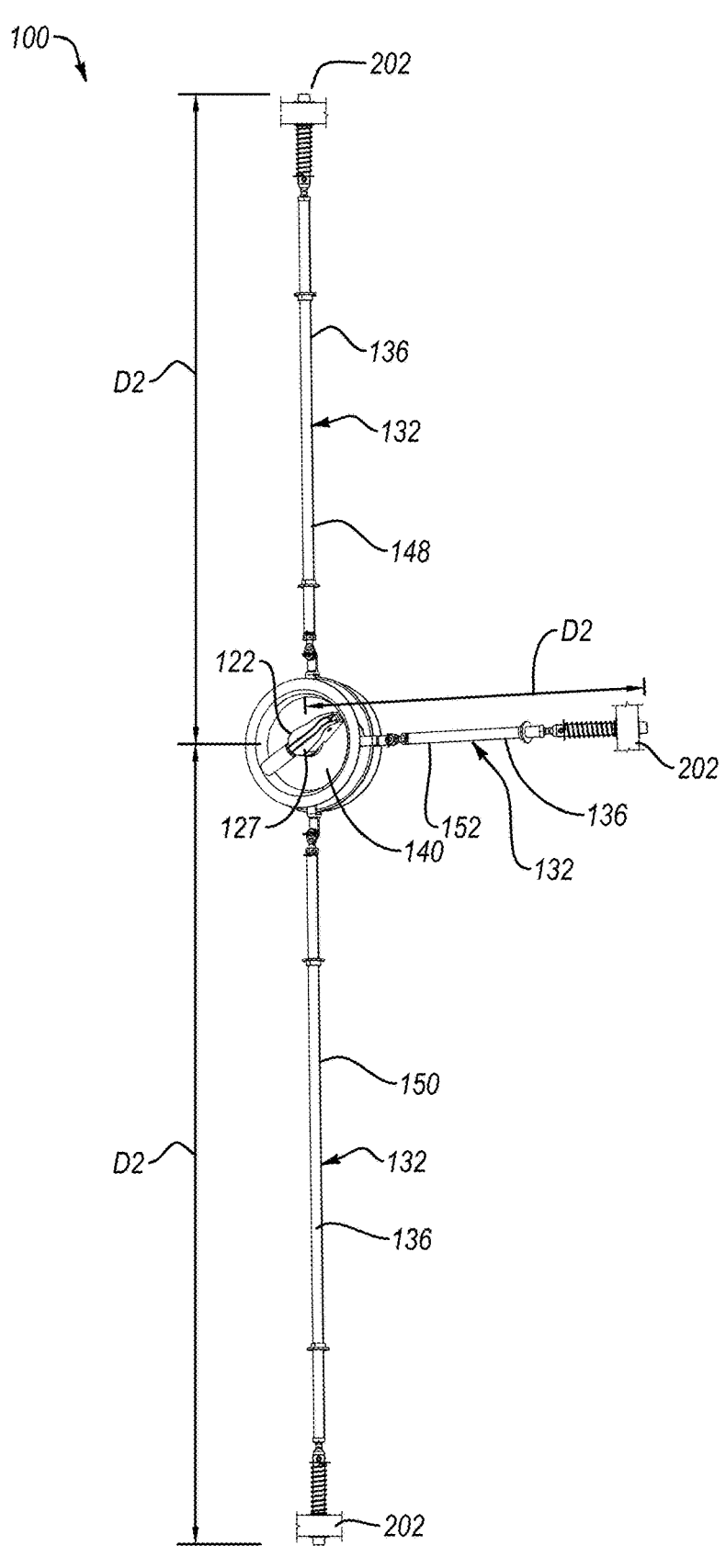
FIG. 1B is a schematic perspective view of the door latch apparatus of FIG. 1A, with the handle system in an open handle position, according to one or more examples of the present disclosure.

Referring to FIGS. 1A and 1B, a door latch apparatus 100 is shown. The door latch apparatus 100 includes a profile disc 102 (see, i.e., FIG. 2), a handle system 122, a plurality of sliders 130 (see, i.e., FIG. 2), and a plurality of locking rods 132. The profile disc 102 and the plurality of sliders 130 are hidden from view by a first outer plate 140, which is configured to cover and conceal internal components of the door latch apparatus 100, in FIGS. 1A and 1B. The handle system 122 is configured to be rotatable between a closed handle position 125 and an open handle position 127. When the handle system 122 is in the closed handle position 125, as shown in FIG. 1A, the plurality of locking rods 132 are in an extended rod position 134. Moreover, in the extended rod position 134, an outer end of each one of the plurality of locking rods 132 is configured to engage with a locking system of a surrounding door frame or other components, to lock each one of the plurality of locking rods 132 in place. In the extended rod position 134, the plurality of locking rods 132 extend outward at a corresponding first distance (D1) from the handle system 122. The corresponding first distance (D1) of each one of the plurality of locking rods 132 is not necessarily the same length, as each one of the plurality of locking rods 132 may have a distinct length, therefore the corresponding first distance (D1) may be unique for each individual locking rod. As such, the corresponding first distance (D1) is used to describe the distance of each one of the plurality of locking rods 132 in the extended rod position 134 relative to a retracted rod position 136.

Conversely, when the handle system 122 is in the open handle position 127, as shown in FIG. 1B, the plurality of locking rods 132 are in a retracted rod position 136. In the retracted rod position 136, the plurality of locking rods 132 extend outward at a corresponding second distance (D2) from the handle system 122. The corresponding second distance (D2) of each one of the plurality of locking rods 132 is less than the corresponding first distance (D1) of each one of the plurality of locking rods 132, allowing the outer end of each one of the plurality of locking rods 132 to disengage with the locking system of the surrounding door frame or other component, to unlock each one of the plurality of locking rods 132. The plurality of locking rods 132 are selectively movable between the extended rod position 134 and the retracted rod position 136 via a corresponding one of the plurality of sliders 130.

In some examples, the plurality of locking rods 132 includes at least two locking rods. In other examples, the plurality of locking rods 132 includes three locking rods. For example, the plurality of locking rods 132 may include a first locking rod 148, a second locking rod 150, and a third locking rod 152. As shown, the first locking rod 148 and the second locking rod 150 extend parallel to each other. That is, the first locking rod 148 extends vertically upward from the handle system 122 and the second locking rod 150 extends vertically downward from the handle system 122. The third locking rod 152 extends perpendicular to the first locking rod 148 and the second locking rod 150, such that the third locking rod 152 extends horizontally from the handle system 122. In other words, the first locking rod 148 is configured to extend through a top edge of a door 202, the second locking rod 150 is configured to extend through a bottom edge of the door 202, and the third locking rod 152 is configured to extend through a side edge of the door 202 (see, i.e., FIG. 6). The length of each one of the plurality of locking rods 132 is fixed, such that the length of the rod does not change. In some examples, each one of the plurality of locking rods 132 has the same length. In other examples, at least one of the plurality of locking rods 132 has a fixed length that is different from at least one other one of the plurality of locking rods 132. For example, the first locking rod 148 and the second locking rod 150 may have the same fixed length, while the third locking rod 152 has a different fixed length.

Figure 2:
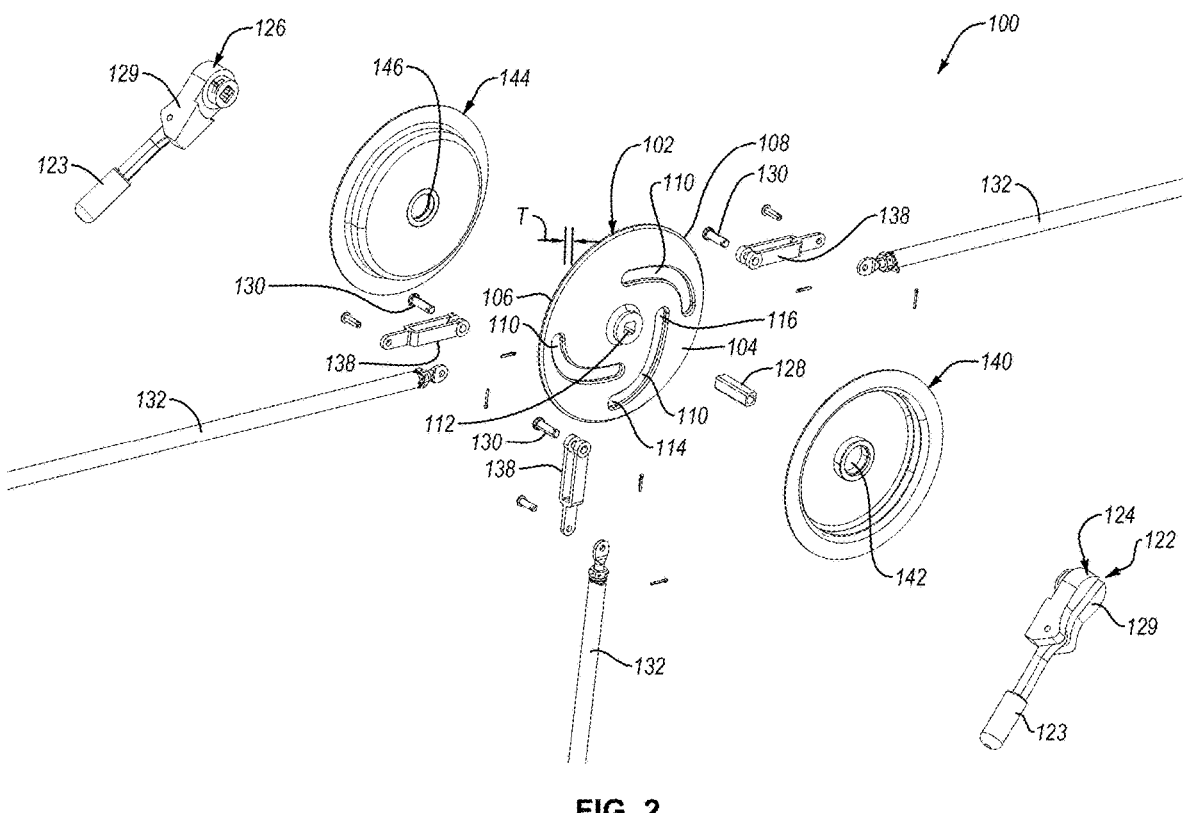
FIG. 2 is a schematic exploded view of the door latch apparatus of FIG. 1A, according to one or more examples of the present disclosure.

Referring to FIG. 2, the door latch apparatus 100 is shown in an exploded view. The profile disc 102 includes a plurality of slots 110 and a central aperture 112. As shown, the profile disc 102 includes three slots, however, the profile disc 102 may have more or less than three slots depending on the needs of the door latch apparatus 100. The plurality of slots 110 and the central aperture 112 extends through a thickness (T) of the profile disc 102, such that each one extends from a first disc surface 104 to a second disc surface 106. Moreover, each one of the plurality of slots 110 curves from a first slot end 114 to a second slot end 116. The first slot end 114 is located adjacent to an outer disc edge 108 of the profile disc 102. That is, the first slot end 114 is closer to the outer disc edge 108 of the profile disc 102 than the second slot end 116. The second slot end 116 is located adjacent to a central aperture 112. That is, the second slot end 116 is closer to the central aperture 112 than the first slot end 114. In some examples, the plurality of slots 110 have a uniform curve, in which a rate of curvature remains consistent along its length. In other examples, the plurality of slots 110 have a non-uniform curve, in which the rate of curvature varies along its length, resulting in some portions with different degrees of bending than other portions. Moreover, each one of the plurality of slots 110 are identically shaped. That is, a distance between each one of the first slot end 114 and the second slot end 116 is the same.

The handle system 122 includes a first handle 124, a second handle 126, and a rod 128 co-rotatably coupling the first handle 124 to the second handle 126. That is, the first handle 124 is fixed, via the rod 128, to the second handle 126, such that the first handle 124 and the second handle 126 are co-rotatable. The rod 128 extends through the central aperture 112 of the profile disc 102, and is co-rotatably fixed to the profile disc 102. In other words, the first handle 124, the second handle 126, the rod 128 and the profile disc 102 are all co-rotatable. More simply, the handle system 122 and the profile disc 102 are co-rotatable and move in tandem as the handle system 122 is rotated, via the first handle 124 or the second handle 126. In some examples, the rod 128 and the central aperture 112 have corresponding sizes and shapes, such as the rod 128 having a rectangular shape and the central aperture 112 having a similar rectangular opening. Moreover, the central aperture 112 is sized and shaped to effectively secure the rod 128 within it, to fix the rod 128 within the central aperture 112 and prevent the rod 128 from moving within the central aperture 112.

The handle system 122 is selectively rotatable between, and inclusive of, the closed handle position 125 and the open handle position 127. The first handle 124 and the second handle 126 may have an extendable handle portion 123 that extends from a handle base 129, as further described in FIGS. 4A and 4B.

The door latch apparatus 100 also includes a plurality of sliders 130. Each one of the plurality of sliders 130 engage with a corresponding one of the plurality of slots 110. The plurality of sliders 130 are configured to slide between the first slot end 114 and the second slot end 116 of the corresponding one of the plurality of slots 110. When the handle system 122 is in the closed handle position 125, the plurality of sliders 130 are positioned at the first slot end 114. Likewise, when the handle system 122 is in the open handle position 127, the plurality of sliders 130 are positioned at the second slot end 116. In other words, when the profile disc 102 rotates, via the handle system 122, the plurality of sliders 130 simultaneously slide along the plurality of slots 110. The plurality of sliders 130 are designed to slide in a smooth and efficient movement during operation of the door latch apparatus 100. In some examples, the plurality of sliders 130 have a slide fit, or a fit within the plurality of slots 110 that allows for controlled movement with some degree of friction between the plurality of sliders 130 and the corresponding one of the plurality of slots 110. In other examples, the plurality of sliders 130 have a free running fit, or a fit within the plurality of slots 110 with minimal friction between the plurality of sliders 130 and the corresponding one of the plurality of slots 110, allowing for smooth and unrestricted movement. As such, the plurality of sliders 130 may be made of any of various materials that have a low or controlled friction coefficient, such as metals or polymers. Additionally, the plurality of sliders 130 may be any of various mechanical components designed to slide within the plurality of slots 110 of the profile disc 102. For example, the plurality of sliders 130 may be a pin, dowel, roller, wheel, rods, spring-loaded pins, etc. In some examples, the plurality of sliders 130 include a pin and at least one bushing, such as a split bushing, that fitted around at least a portion of the pin. Accordingly, the at least one bushing and, in some cases a portion of the pin, engage with the corresponding one of the plurality of slots 110 as it slides along the corresponding one of the plurality of slots.

The plurality of locking rods 132 are coupled to a corresponding one of the plurality of sliders 130. Accordingly, as the plurality of sliders 130 slide between the first slot end 114 and the second slot end 116, the plurality of locking rods 132 extend or retract, respectively. Specifically, the plurality of locking rods 132 are linearly movable between, and inclusive of, the extended rod position 134 and the retracted rod position 136 when the corresponding one of the plurality of sliders 130 slides along the corresponding one of the plurality of slots 110. As the length of the plurality of locking rods 132 is fixed, the length of the plurality of locking rods 132 does not change as the plurality of locking rods 132 are linearly moved. Rather a distance that the plurality of locking rods 132 extends from the handle system 122 is changed based on the location of the corresponding one of the plurality of sliders 130 within the corresponding one of the plurality of slots 110 (see, i.e., FIGS. 1A and 1B). As each one of the plurality of slots 110 are identically shaped, a distance that each one of the plurality of locking rods 132 moves between the extended rod position 134 and the retracted rod position 136 is the same. In some examples, the plurality of locking rods 132 are elongated rods that extend from the corresponding one of the plurality of sliders 130 to the corresponding door edge. For example, the plurality of locking rods 132 may be cylindrical rods. Additionally, the plurality of locking rods 132 are formed from a rigid material, such as a metal or polymer.

In some examples, each one of the plurality of locking rods 132 is coupled to the corresponding one of the plurality of sliders 130 via one of a plurality of rod connectors 138. Accordingly, the plurality of rod connectors 138 are positioned between the corresponding slider and locking rod. Specifically, each one of the plurality of rod connectors 138 is rotatably coupled to the corresponding one of the plurality of sliders 130, allowing the plurality of rod connectors 138 to rotate, relative to the corresponding one of the plurality of sliders 130. Moreover, the plurality of rod connectors 138 are coupled to the corresponding one of the plurality of locking rods 132 in a fixed (i.e., rigid) connection, such that the plurality of rod connectors 138 and the plurality of locking rods 132 are non-rotationally coupled, relative to each other. The configuration of the plurality of rod connectors 138 allows the rod connectors to facilitate the sliding movement of the plurality of sliders 130, translating it into linear movement of the plurality of locking rods 132. In other examples, each one of the plurality of locking rods 132 is directly coupled to the corresponding one of the plurality of sliders 130.

The door latch apparatus 100, in some examples, includes a first outer plate 140 and a second outer plate 144, configured to be positioned on either side of the profile disc 102. Accordingly, the first outer plate 140 and the second outer plate 144 cover the profile disc 102 from view, when the door latch apparatus 100 is attached to a door. The first outer plate 140 is positioned adjacent to the first surface 104 of the profile disc 102 and between the profile disc 102 and the first handle 124 of the handle system 122. The second outer plate 144 is positioned adjacent to the second disc surface 106 of the profile disc 102 and between the profile disc 102 and the second handle 126 of the handle system 122. The first outer plate 140 includes a first-plate central aperture 142 and the rod 128 of the handle system 122 extends through the first-plate central aperture 142. Likewise, the second outer plate 144 includes a second-plate central aperture 146 and the rod 128 of the handle system 122 extends through the second-plate central aperture 146. In some examples, the first outer plate 140 and the second outer plate 144 are configured to co-rotate with the handle system 122. In other examples, the first outer plate 140 and the second outer plate 144 are configure to be fixed, relative to the handle system 122.

Figure 3A:
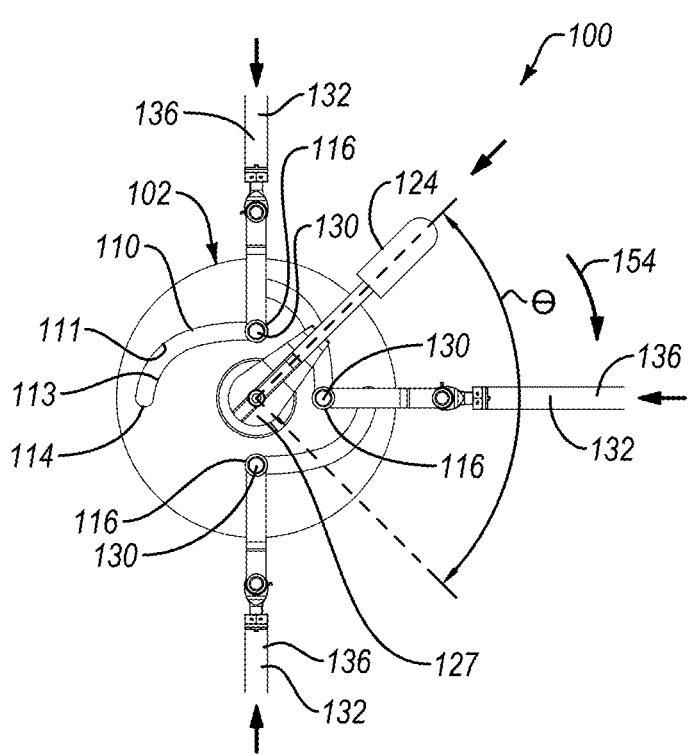
FIG. 3A is a schematic, front, partial view of a door latch apparatus in an open handle position, according to one or more examples of the present disclosure.

Referring to FIG. 3A, the door latch apparatus 100 is shown with the first handle 124 in the open handle position 127. Although only the first handle 124 is shown, the second handle 126 would also be in the open handle position 127, as the handle system 122 is co-rotatably coupled. When in the open handle position 127, the plurality of locking rods 132 are in the retracted rod position 136, as illustrated by arrows pointing towards the profile disc 102, and the plurality of sliders 130 are positioned at the second slot end 116. The first handle 124 is rotated in a locking direction 154 as the first handle 124 is moved from the open handle position 127 to the closed handle position 125. The door latch apparatus 100 may be moved in the locking direction 154 by either one of the first handle 124 or the second handle 126, such that the door latch apparatus 100 may be accessed from either side of a door to which the door latch apparatus 100 is coupled.

Figure 3B:
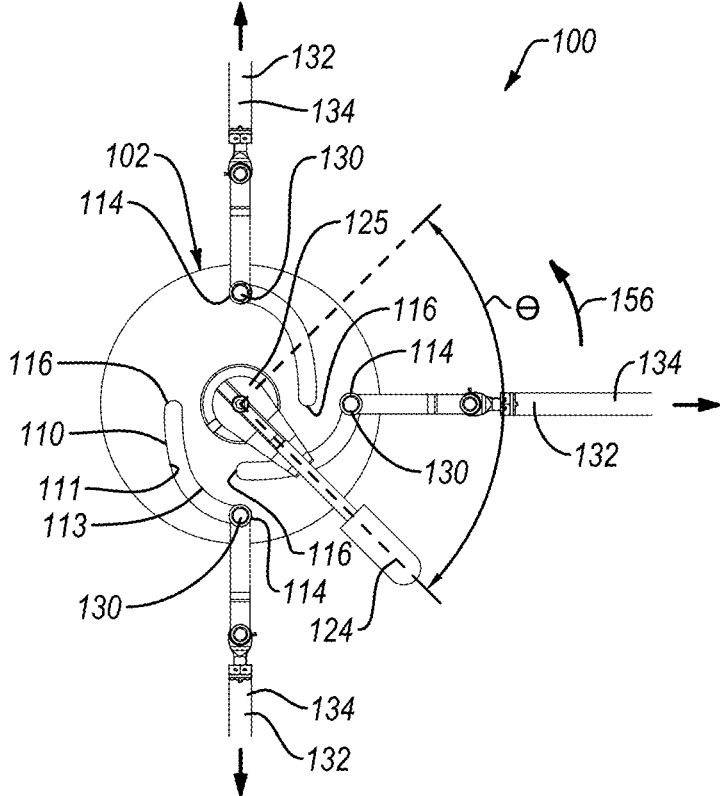
FIG. 3B is a schematic, front, partial view of the door latch apparatus of FIG. 4A in a closed handle position, according to one or more examples of the present disclosure.

Referring to FIG. 3B, the door latch apparatus 100 is shown with the first handle 124 in the closed handle position 125. When in the closed handle position 125, the plurality of locking rods 132 are in the extended rod position 134, as illustrated by arrows pointing away from the profile disc 102, and the plurality of sliders 130 are positioned at the first slot end 114. The first handle 124 is rotated in an unlocking direction 156 as the first handle 124 is moved from the closed handle position 125 to the open handle position 127. The first handle 124 has an angle of rotation θ between the open handle position 127 and the closed handle position 125. In some examples, the angle of rotation θ of the first handle 124 is one-hundred and eighty degrees or less between the open handle position 127 and the closed handle position 125. In other examples, the angle of rotation θ of the first handle 124 is ninety-degrees or less between the open handle position 127 and the closed handle position 125. Moreover, the angle of rotation θ of the first handle 124 is ergonomically designed to enhance user comfort and ease of operation when utilizing the door latch apparatus 100.

The plurality of slots 110 include an outer wall 111 and an inner wall 113, opposite of the outer wall 111. The outer wall 111 and the inner wall 113 are configured to slidably engage with a corresponding one of the plurality of sliders 130 as the plurality of sliders 130 slide along the plurality of slots 110 to facilitate the extension or retraction of a corresponding one of the plurality of locking rods 132. That is, as the first handle 124 is rotated from the closed handle position 125 to the open handle position 127, pressure from the outer wall 111 of the corresponding one of the plurality of slots 110 will cause the one of the plurality of locking rods 132 to retract (i.e. pull) from the corresponding door edge. In other words, as the first handle 124 is opened, the slot exerts a downward force on the rod, facilitating the release of the latch mechanism. Conversely, as the handle system 122 is rotated from the open handle position 127 to the closed handle position 125, pressure from the inner wall 113 of the corresponding one of the plurality of slots 110 will cause the one of the plurality of locking rods 132 to extend (i.e., push) toward to corresponding door edge. Accordingly, as the first handle 124 is closed, the slot exerts an upward force on the rod, facilitating the locking of the latch mechanism.

Figure 4A:
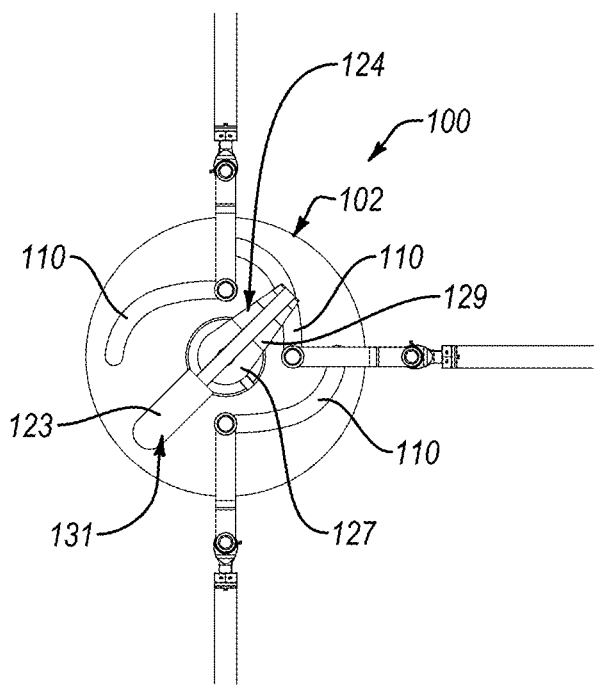
FIG. 4A is a schematic, front, partial view of a door latch apparatus in an open handle position, with a handle in a folded position, according to one or more examples of the present disclosure.
Figure 4B:
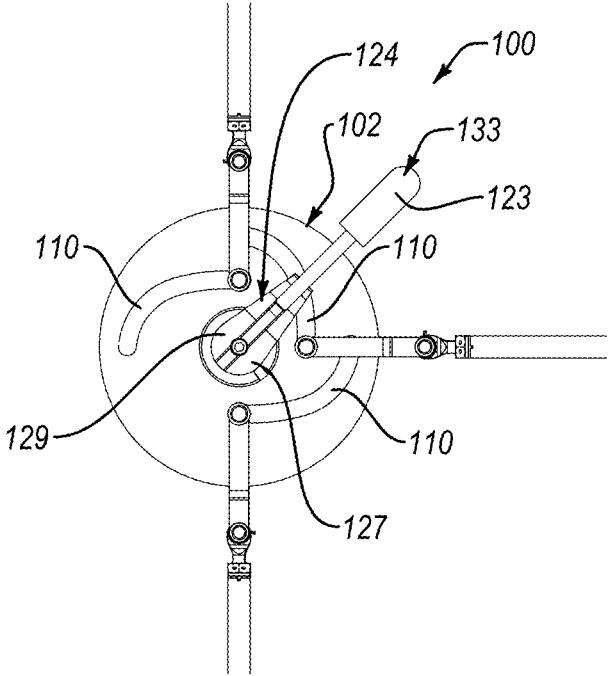
FIG. 4B is a schematic, front, partial view of the door latch apparatus of FIG. 4A, with the handle in an unfolded position, according to one or more examples of the present disclosure.

As shown in FIGS. 4A and 4B, in some examples, the first handle 124 (and the second handle 126, not shown) is a foldable handle having an extendable handle portion 123. That is, the first handle 124 includes a handle base 129 from which the extendable handle portion 123 is extendable, relative to a handle base 129. In other words, the extendable handle portion 123 is selectively movable between, and inclusive of, a folded position 131 and an extended position 133. The extendable handle portion 123, in the extended position 133, may be utilized when rotating the handle system 122 between the open handle position 127 and the closed handle position 125. Referring to FIG. 4A, the extendable handle portion 123 is in the folded position 131, such that the extendable handle portion 123 is folded into the handle base 129. The folded position 131 of the first handle 124 allows for a more compact design when the first handle 124 is not in use. Additionally, the folded position 131 may reduce the risk of accidental activation of the first handle 124. In some examples, the extendable handle portion 123 is folded into the handle base 129, rotating about a pivot point. Alternatively, in other examples, the extendable handle portion 123 may telescope into the handle base 129 while in the folded position 131.

Referring to FIG. 4B, the extendable handle portion 123 is in the extended position 133, such that the extendable handle portion 123 extends away from the handle base 129. When the first handle 124 is in the extended position 133, the extendable handle portion 123 provides a user with an accessible grip area, making the door latch apparatus 100 easier to operate. That is, the extendable handle portion 123 extends at a distance in the extended position 133 that is easier to access and operate than when in the folded position 131. Additionally, when in the extended position 133, a user may exert greater leverage on the extendable handle portion 123 when rotating the first handle 124, facilitating a smoother and more effortless operation of the door latch apparatus 100. The extendable handle portion 123 may be pivoted away from the handle base 129, or may telescope away from the handle base 129, while in the extended position 133.

Figure 5:
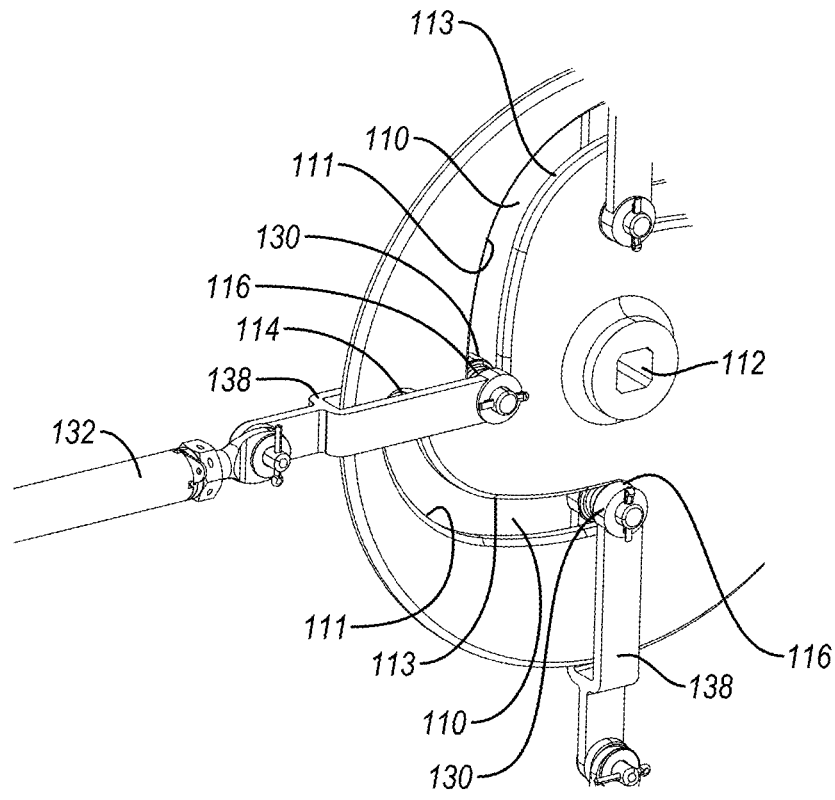
FIG. 5 is a schematic, perspective, partial view of a door latch apparatus, with a slider in an open handle position, according to one or more examples of the present disclosure.

As shown in FIG. 5 is a partial view of the door latch apparatus 100, illustrating a closer view of the plurality of sliders 130 engaged the corresponding one of the plurality of slots 110. The plurality of sliders 130 extend through the corresponding one of the plurality of slots 110 and slidably engage with the outer wall 111 and the inner wall 113 of the corresponding slot. This facilitates the extension or retraction of the corresponding one of the plurality of locking rods 132 as the plurality of sliders 130 simultaneously slide in the corresponding slot. Specifically, the corresponding one of the plurality of locking rods 132 extend to the extended rod position 134, as the plurality of sliders 130 slide from the second slot end 116 to the first slot end 114. Similarly, the corresponding one of the plurality of locking rods 132 retract to the retracted rod position 136 as the plurality of sliders 130 slide from the first slot end 114 to the second slot end 116.

The plurality of sliders 130 are designed to ensure smooth and efficient movement within the door latch apparatus 100. The plurality of sliders 130 may having a slide fit or a free running fit within the plurality of slots 110, offering controlled movement with friction or minimal friction for smooth and unrestricted operation, respectively. In some examples, the plurality of sliders 130 include a pin fitted within at least one bushing, which engages with the corresponding one of the plurality of slots 110.

Figure 6:
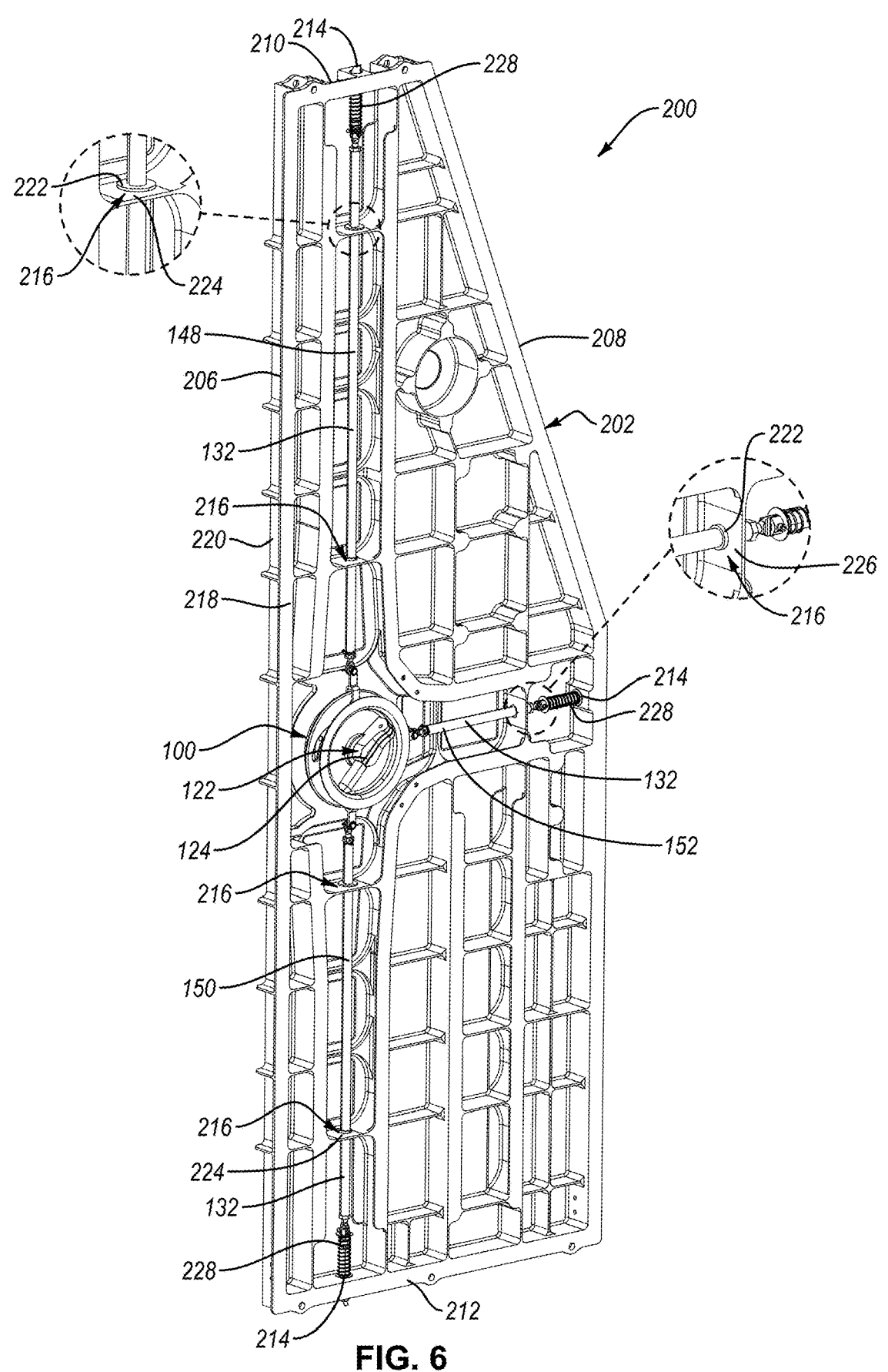
FIG. 6 is a schematic perspective view of a door having a door latch apparatus, according to one or more examples of the present disclosure.

As shown in FIG. 6 is a door latch system 200. The door latch system 200 includes a door 202 and the door latch apparatus 100, as described above. In some examples, the door 202 is a rigid cargo barrier (RCB) door used in a vehicle that separates cargo from other compartments. For example, the RCB door may be used in an aircraft, such as a freighter aircraft, to separate a cargo hold from other compartments, such as a flight deck compartment. That is, the RCB door and door latch apparatus 100 may be used by flight crews to gain access to, or close off, the cargo hold. The RCB door may provide protection against shifting cargo and, in some examples, smoke and fire. In some examples, the door 202 is a sliding door that is configured to be horizontally slidable along a track or slot when the door latch apparatus 100 is unlocked, allowing for the opening and closing of the door 202. In other examples, the door 202 is a hinged door that is configured to be pivotable to swing the door 202 open or closed around hinges when the door latch apparatus 100 is unlocked, to open and close the door 202.

The door latch apparatus 100 allows the door 202 to be operated from either side of the door 202. That is, the first handle 124 is accessible from a first door side 218 and the second handle 126 is accessible from the second door side 220, opposite the first door side 218. As the first handle 124 and the second handle 126 are co-rotatable coupled, any action to one handle will be translated to the other handle. The door 202 includes a plurality of apertures 214 along edges of the door 202, allowing for the plurality of locking rods 132 to extend from a corresponding one of the plurality of apertures 214. The plurality of apertures 214 are in at least one of a first edge 206, a second edge 208, a top edge 210, or a bottom edge 212 of the door 202. The plurality of locking rods 132 extend from the corresponding one of the plurality of sliders 130 and through a corresponding one of the plurality of apertures 214.

As shown, the door latch apparatus 100 includes three locking rods. A first locking rod 148 extends from a corresponding one of the plurality of apertures 214 on the top edge 210 of the door 202, a second locking rod 150 extends from a corresponding one of the plurality of apertures 214 on the bottom edge 212 of the door 202, and a third locking rod 152 extends from a corresponding one of the plurality of apertures 214 on the second edge 208 of the door 202. The plurality of locking rods 132 are slidably movable within the corresponding one of the plurality of apertures 214. Accordingly, the plurality of locking rods 132 slide within the corresponding one of the plurality of apertures 214 as the plurality of locking rods 132 are moved between the extended rod position 134 and the retracted rod position 136. In the extended rod position 134, the plurality of locking rods 132 extend at a greater distance from the corresponding one of the plurality of apertures 214 than in the retracted rod position 136, such that the plurality of locking rods 132 can engage with the surrounding door frame or other components to lock the plurality of locking rods 132 in place. In the retracted rod position 136, the plurality of locking rods 132 are supported by the corresponding one of the plurality of apertures 214, but extend at a lesser distance than in the extended rod position 134. In some examples, the plurality of locking rods 132 may not extend beyond the corresponding one of the plurality of apertures 214.

In some examples, the door 202 includes a plurality of supporting ribs 216, each one of the plurality of supporting ribs 216 having a corresponding rib aperture 222. The plurality of supporting ribs 216 are configured to support a corresponding one of the plurality of locking rods 132 in the door 202, while maintaining the orientation of the locking rods 132 during linearly movement. Accordingly, each one of the plurality of locking rods 132 extends through a corresponding rib aperture 222 of at least one of the plurality of supporting ribs 216. In some examples, at least one of the plurality of locking rods 132 may extend through two or more supporting ribs 216. The plurality of supporting ribs 216 may include horizontal ribs 224 and/or vertical ribs 226, allowing the plurality of supporting ribs 216 to support locking rods that extend vertically and/or horizontally from the profile disc 102. For example, the first locking rod 148 extends through two horizontal ribs 224 of the plurality of supporting ribs 216, the second locking rod 150 extends through two additional horizontal ribs 224 of the plurality of supporting ribs 216, and the third locking rod 152 extends through one vertical rib 226 of the plurality of supporting ribs 216. The plurality of locking rods 132 can freely move within the rib aperture 222 of the corresponding one of the plurality of supporting ribs 216, such that the supporting ribs do not inhibit the linear movement of the locking rods 132 as the door latch apparatus 100 is utilized.

Figure 7A:
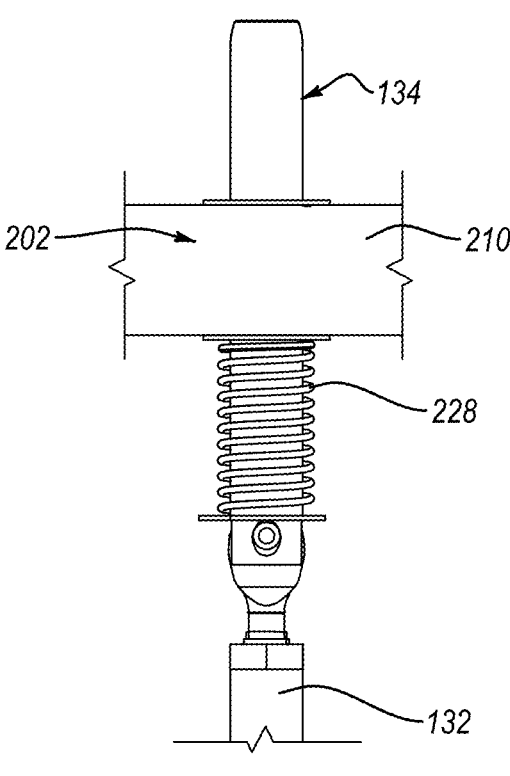
FIG. 7A is a schematic perspective view of a locking rod of a door latch apparatus in an extended rod position, according to one or more examples of the present disclosure.
Figure 7B:
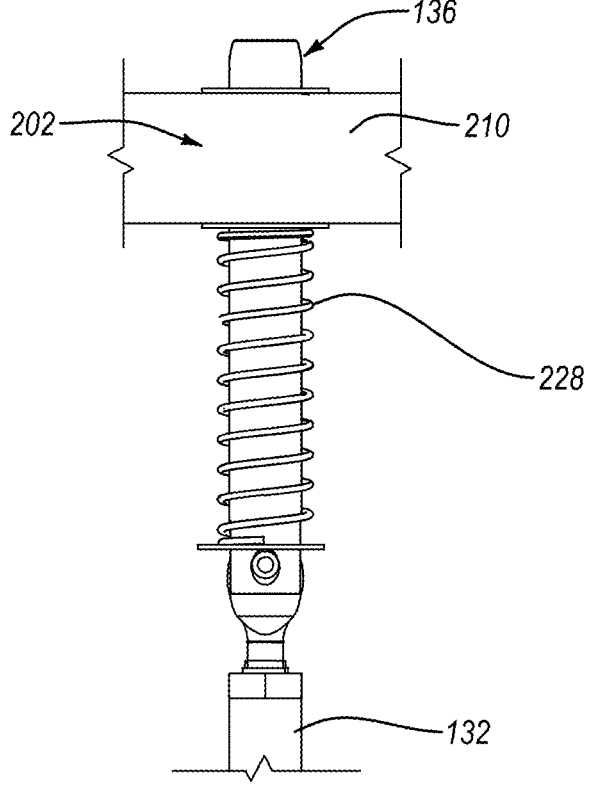
FIG. 7B is a schematic perspective view of the locking rod of FIG. 7A in a retracted rod position, according to one or more examples of the present disclosure.

As shown in FIGS. 7A and 7B, each one of the plurality of locking rods 132 may include a spring-loaded mechanism. The spring-loaded mechanism on each one of the plurality of locking rods 132 has a spring 228 that is configured to compress and expand as the plurality of locking rods 132 are moved between, and inclusive of, the extended rod position 134 and the retracted rod position 136, respectively. Accordingly, when the plurality of locking rods 132 are in the extended rod position 134, as shown in FIG. 7A, the spring 228 corresponding to each one of the plurality of locking rods 132 is compressed. That is, the spring 228 is compressed against the door 202, such as against the top edge 210 of the door 202. Likewise, when the plurality of locking rods 132 are in the retracted rod position 136, as shown in FIG. 7B, the spring 228 corresponding to each one of the plurality of locking rods 132 is expanded. That is, the spring 228 is expanded remaining adjacent to the door 202, such as the top edge 210 of the door 202.

Referring to FIG. 8, is a method of operating a door latch apparatus 100. The method 300 includes (block 302) unlocking the door latch apparatus 100 by rotating a handle of a handle system 122 in an unlocking direction 156 from a closed handle position 125 to an open handle position 127. A plurality of locking rods 132 are retracted from an extended rod position 134 to a retracted rod position 136 via a plurality of sliders 130 simultaneously sliding along a curved path from a first slot end 114 to a second slot end 116 of a corresponding one of a plurality of slots 110 of a profile disc 102. The handle system 122 may be operated by rotating either a first handle 124 on a first side of a door 202, or rotating a second handle 126 on a second side of a door 202, opposite of the first side.

The method 300 also includes (block 304) locking the door latch apparatus 100 by rotating the handle of the handle system 122 in a locking direction 154, opposite of the unlocking direction, from the open handle position 127 to the closed handle position 125 to extend the plurality of locking rods 132 from the retracted rod position 136 to the extended rod position 134 via the plurality of sliders 130 simultaneously sliding along the curved path from the second slot end 116 of the first slot end 114 of the corresponding one of the plurality of slots 110 of the profile disc 102.

In some examples, the method 300 also includes unfolding the handle of the handle system from a folded position 131 to an extended position 133 prior to unlocking the door latch apparatus 100. The method 300 may also include folding the handle of the handle system 122 from the extended position 133 to the folded position 131 after locking the door latch apparatus 100.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A door latch apparatus comprising:

a profile disc having a disc thickness and comprising a plurality of slots and a central aperture, wherein the plurality of slots and the central aperture each extends through the disc thickness, and wherein each one of the plurality of slots curves from a first slot end, adjacent to an outer disc edge of the profile disc, to a second slot end, adjacent to the central aperture;

a handle system comprising a first handle, a second handle, and a rod co-rotatably coupling the first handle to the second handle, wherein:

the rod extends through the central aperture of the profile disc and is co-rotatably fixed, relative to the profile disc, such that the first handle, the second handle, the rod, and the profile disc are co-rotatable;

the first handle and the second handle are selectively rotatable between, and inclusive of, a closed handle position and an open handle position; and the first handle and the second handle each comprises a handle base and an extendable handle portion that is selectively movable between, and inclusive of, a folded position and an extended position, when in the folded position, the extendable handle portion is folded into the handle base and entirely within a perimeter of the profile disc, and when in the extended position, the extendable handle portion extends away from the handle base and at least a portion of the extendable handle portion extends beyond the perimeter of the profile disc;

a plurality of sliders each engaged with a corresponding one of the plurality of slots so that, when the profile disc rotates, the plurality of sliders simultaneously slide along the plurality of slots; and a plurality of locking rods each coupled to a corresponding one of the plurality of sliders, and each linearly movable between, and inclusive of, an extended rod position and a retracted rod position when the corresponding one of the plurality of sliders slides along the corresponding one of the plurality of slots;

wherein:

when the first handle and the second handle are in the closed handle position, the plurality of locking rods are in the extended rod position and the plurality of sliders are positioned the first slot end; and when the first handle and the second handle are in the open handle position, the plurality of locking rods are in the retracted rod position and the plurality of sliders are positioned at the second slot end.

2. The door latch apparatus of claim 1, wherein:

each one of the plurality of slots are identically shaped; and a distance that each one of the plurality of locking rods moves between the extended rod position and the retracted rod position is the same.

3. The door latch apparatus of claim 1, further comprising:

a first outer plate comprising a first-plate central aperture and positioned between the first handle and the profile disc; and a second outer plate comprising a second-plate central aperture and positioned between the second handle and the profile disc;

wherein the rod of the handle system extends through the first-plate central aperture and the second-plate central aperture.

4. The door latch apparatus of claim 1, wherein at least one of the plurality of locking rods has a fixed length that is different than at least one other one of the plurality of locking rods.

5. The door latch apparatus of claim 1, wherein the plurality of locking rods consists of three locking rods.

6. The door latch apparatus of claim 5, wherein the plurality of locking rods comprises:

a first locking rod;

a second locking rod extending parallel to the first locking rod; and a third locking rod extending perpendicular to the first locking rod and the second locking rod.

7. The door latch apparatus of claim 1, further comprising a plurality of rod connectors each coupling a corresponding one of the plurality of sliders to a corresponding one of the plurality of locking rods, wherein each one of the plurality of rod connectors is rotatably coupled to the corresponding one of the plurality of sliders and is coupled to the corresponding one of the plurality of locking rods such that movement of the corresponding one of the plurality of sliders is translated into linear movement of the corresponding one of the plurality of locking rods.

8. The door latch apparatus of claim 1, wherein the first handle and the second handle are configured to selectively rotate ninety degrees or less between the closed handle position and the open handle position.

9. The door latch apparatus of claim 1, wherein each one of the plurality of slots comprises a continuous curved profile extending along a length of each one of the plurality of slots.

10. The door latch apparatus of claim 1, wherein each one of the plurality of slots comprise a non-uniform curve with a rate of curvature that varies along a length of each one of the plurality of slots.

11. The door latch apparatus of claim 1, wherein:

the plurality of slots comprises an outer wall and an inner wall, opposite the outer wall; and the outer wall and the inner wall are configured to slidably engage with a corresponding one of the plurality of sliders as the plurality of sliders slide along the plurality of slots to facilitate an extension or retraction of a corresponding one of the plurality of locking rods.

12. The door latch apparatus of claim 1, wherein the extendable handle portion is pivotably coupled to the handle base.

13. A door latch system comprising:

a door comprising a plurality of rod apertures; and a door latch apparatus coupled to the door comprising:

a profile disc having a disc thickness and comprising a plurality of slots and a central aperture, wherein the plurality of slots and the central aperture each extends through the disc thickness, and wherein each one of the plurality of slots curves from a first slot end, adjacent to an outer disc edge of the profile disc, to a second slot end, adjacent to the central aperture;

a handle system comprising a first handle, a second handle, and a rod co-rotatably coupling the first handle to the second handle, wherein;

the rod extends through the central aperture of the profile disc and is co-rotatably fixed, relative to the profile disc, such that the first handle, the second handle, the rod, and the profile disc are co-rotatable;

the first handle and the second handle is selectively rotatable between, and inclusive of, a closed handle position and an open handle position; and the first handle and the second handle each comprises a handle base and an extendable handle portion that is selectively movable between, and inclusive of, a folded position and an extended position, when in the folded position, the extendable handle portion is folded into the handle base and entirely within a perimeter of the profile disc, and when in the extended position, the extendable handle portion extends away from the handle base and at least a portion of the extendable handle portion extends beyond the perimeter of the profile disc;

a plurality of sliders each engaged with a corresponding one of the plurality of slots so that, when the profile disc rotates, the plurality of sliders simultaneously slide along the plurality of slots; and a plurality of locking rods each coupled to a corresponding one of the plurality of sliders, and each linearly movable between, and inclusive of, an extended rod position and a retracted rod position when the corresponding one of the plurality of sliders slides along the corresponding one of the plurality of slots;

wherein:

each one of the plurality of locking rods extends through a corresponding one of the plurality of the rod apertures of the door;

when the first handle and the second handle are in the closed handle position, the plurality of locking rods are in the extended rod position and the plurality of sliders are positioned at the first slot end; and when the first handle and the second handle are in the open handle position, the plurality of locking rods are in the retracted rod position the plurality of sliders are positioned at the second slot end.

14. The door latch system of claim 13, wherein:

the door comprises a plurality of supporting ribs having a rib aperture;

each one of the plurality of locking rods extends through a corresponding rib aperture of at least one of the plurality of supporting ribs.

15. The door latch system of claim 14, wherein the plurality of supporting ribs comprises at least one of a horizontal rib or a vertical rib.

16. The door latch system of claim 13, wherein:

each one of the plurality of locking rods comprises a spring-loaded mechanism having a spring;

when the plurality of locking rods are in the extended rod position, the spring corresponding to each one of the plurality of locking rods is compressed; and when the plurality of locking rods are in the retracted rod position, the spring corresponding to each one of the plurality of locking rods is expanded.

17. The door latch system of claim 13, wherein the door is a sliding door.

18. The door latch system of claim 13, wherein the door is a rigid cargo barrier door for an aircraft.

19. A method of operating a door latch apparatus, the method comprising:

selectively moving an extendable handle portion of a handle of a handle system from a folded position, in which the extendable handle portion is positioned entirely within a perimeter of a profile disc, to an extended position, in which the extendable handle portion at least partially extends outside the perimeter of the profile disc;

unlocking the door latch apparatus by rotating a handle of a handle system in an unlocking direction from a closed handle position to an open handle position to retract a plurality of locking rods from an extended rod position to a retracted rod position via a plurality of sliders simultaneously sliding along a curved path from a first slot end to a second slot end of a corresponding one of a plurality of slots of a profile disc; and locking the door latch apparatus by rotating the handle of the handle system in a locking direction, opposite the unlocking direction, from the open handle position to the closed handle position to extend the plurality of locking rods from the retracted rod position to the extended rod position via the plurality of sliders simultaneously sliding along the curved path from the second slot end to the first slot end of the corresponding one of the plurality of slots of the profile disc.

20. The method of claim 19, further comprising:

folding the handle of the handle system from the extended position to the folded position after locking the door latch apparatus by rotating the handle in the locking direction.

* * * * *